July 12, 1960  V. H. PAVLECKA  2,944,397
COMBUSTION CHAMBERS FOR GAS TURBINE POWER PLANTS
Original Filed March 19, 1951  4 Sheets-Sheet 1

INVENTOR.
VLADIMIR H. PAVLECKA
BY
Nicholas T. Volsk
his ATTORNEY.

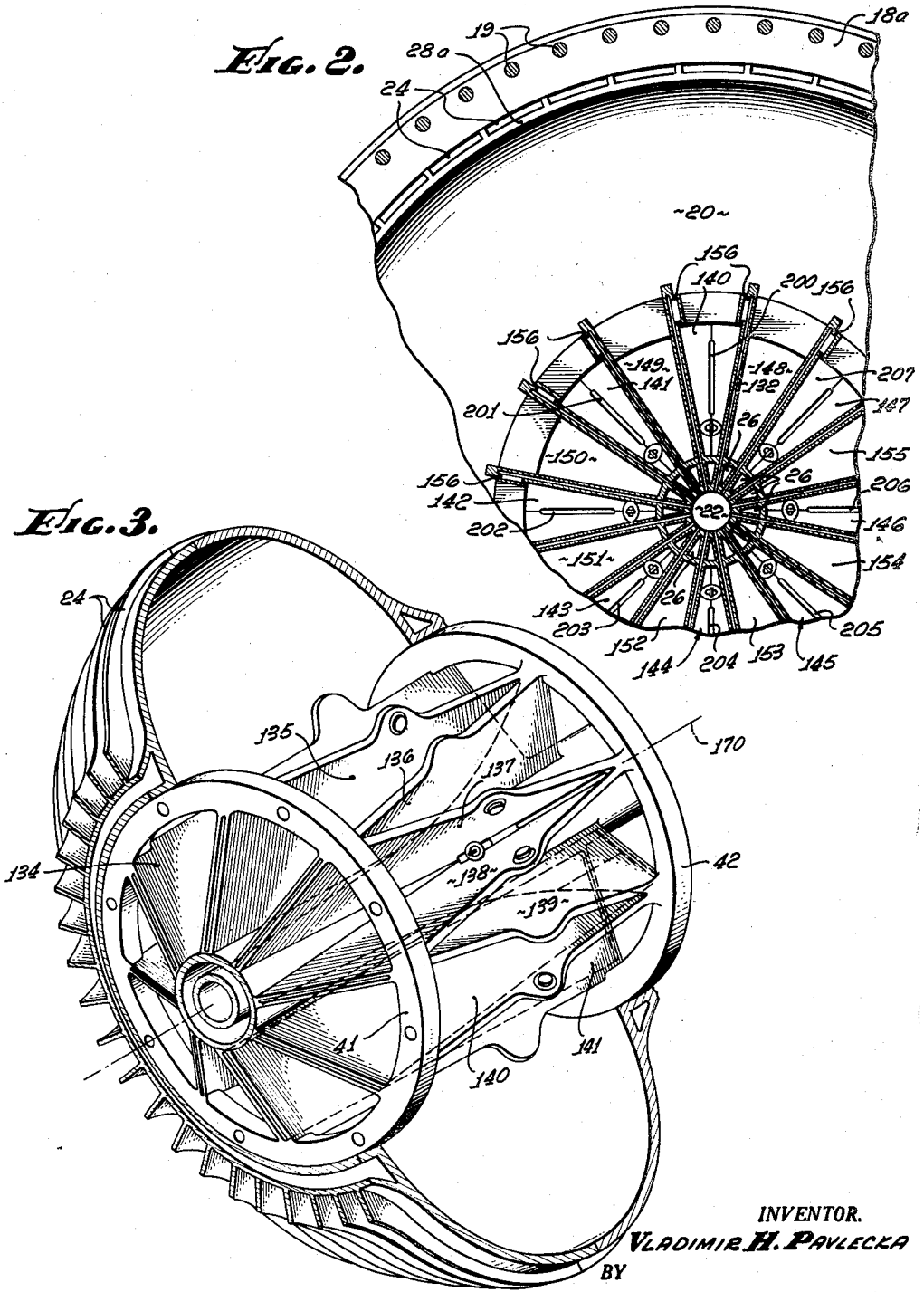

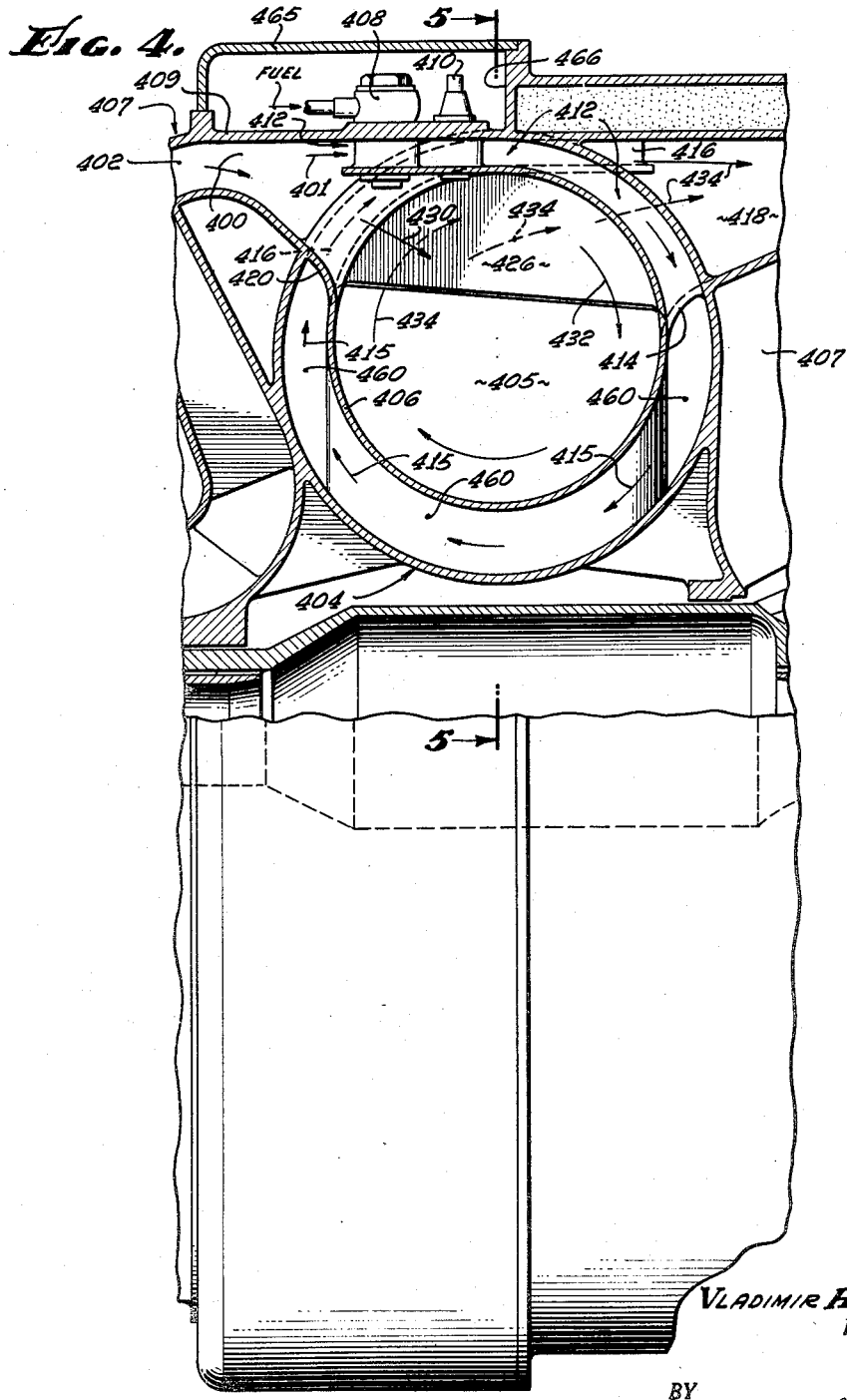

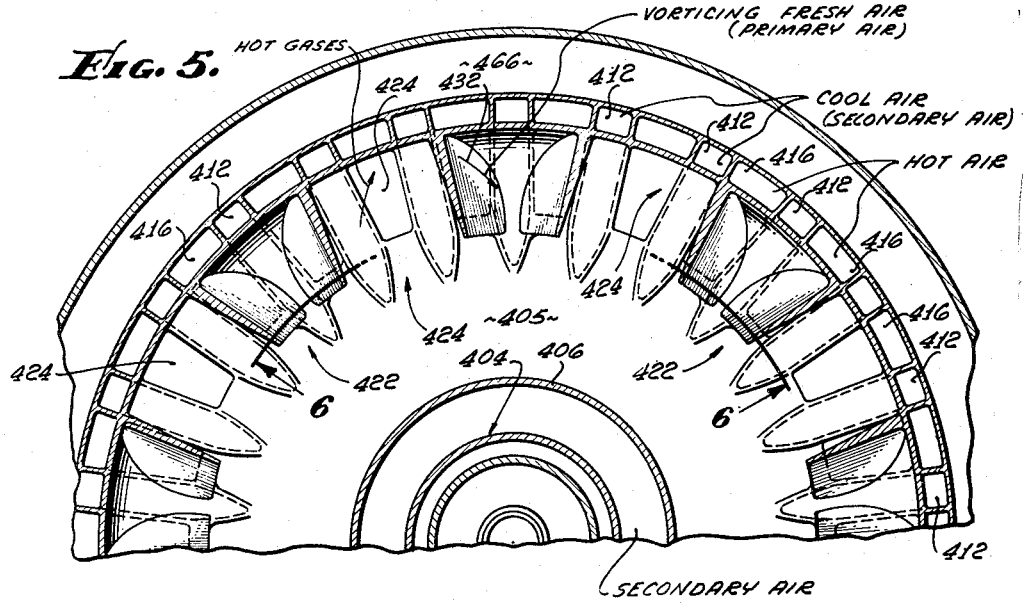
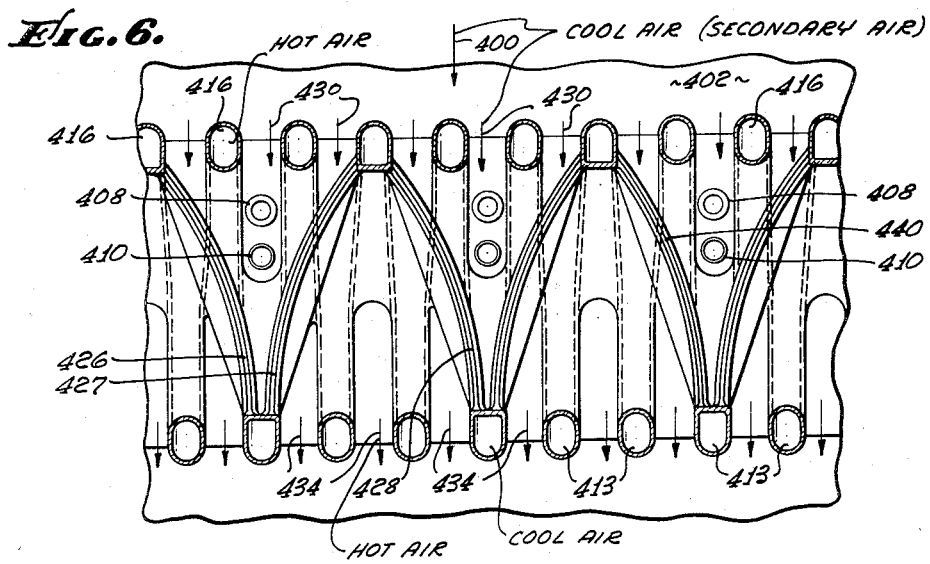

United States Patent Office 2,944,397
Patented July 12, 1960

2,944,397

COMBUSTION CHAMBERS FOR GAS TURBINE POWER PLANTS

Vladimir H. Pavlecka, Los Angeles, Calif., assignor to American Machine & Foundry Company, a corporation of New Jersey Original applications Mar. 23, 1951, Ser. No. 217,347, and Mar. 19, 1951, Ser. No. 216,305, now Patent Nos. 2,804,747, dated Sept. 3, 1957, and 2,809,493, dated Oct. 15, 1957. Divided and this application Aug. 27, 1956, Ser. No. 606,451

10 Claims. (Cl. 60—39.36)

This invention relates to combustion chambers for power plants where compressed air and fuel are mixed and burned for producing heated gases which are then used as a source of kinetic and potential energy. Combustion chambers of the above type find their widest application at this time in gas turbine power plants where a dynamic compressor supplies compressed air into the chamber; a fuel pump also supplies fuel into the chamber, where it is burned, and heated gases are expanded through a turbine which furnishes a motive power for operating the compressor. The useful power may be a shaft power or a thrust. In the latter case, the gas turbines of the above type are generally known as jet engines.

This application for patent is a divisional application of the parent application Serial No. 217,347, filed March 23, 1951, titled "Gas Turbine Power Plant With a Supersonic Centripetal Flow Compressor and Centrifugal Flow Turbine" which matured into Patent 2,804,747, issued September 3, 1957. The combustion chamber disclosed in application S.N. 217,347 corresponds to Figures 1, 2 and 3 in this application. This application is also a divisional application of the parent application Serial No. 216,305, filed on March 19, 1951, and titled, "Gas Turbine Power Plant," now U.S. Patent 2,809,493, issued October 15, 1957, which discloses a combustion chamber appearing in Figures 4, 5 and 6 in this application.

It is an object of this invention to provide a toroidal combustion chamber having a plurality of wedge-shaped input ports for receiving compressed air and a corresponding plurality of output ports for discharging heated gases.

It is also an object of this invention to provide a combustion chamber shaped as a toroid, and having a plurality of exit and entry ports, said chamber being constructed to have a staionary flame front located at the center of the toroid and stationary vortex flame mass, thus insuring the geometric stability of the combustion locus and eliminating the blow-outs which occur in combustion chambers in which stabilization of the flame front is obtained by means of baffle plates within the chambers.

It is an additional object of this invention to provide a toroidally shaped combustion chamber which can be made to rotate with a compressor-turbine combination, and which can be made as a stationary combustion chamber positioned between a compressor and a turbine.

Yet an additional object of this invention is to provide a toroidally shaped combustion chamber having an inner toroid for burning fuel and an outer toroid, surrounding the inner toroid, the outer toroid receiving compressed air from the compressor and discharging it into hot gases leaving the inner toroid, the compressed air, flowing between the two toroids, acting as a cooling medium for the wall of the inner toroid.

It is also an object of this invention to provide a toroidally-shaped combustion chamber having input and output ports mutually interleaving each other, the input ports having fuel nozzles, said input ports and nozzles being uniformly distributed around the outer periphery of the toroid in one type of chamber, and around the inner periphery of the toroid in another type of chamber.

The novel features which are believed to be characteristic of the invention, both as to its organization and method of operation, together with further objects and advantages thereof, will be better understood from the following description considered in connection with the accompanying drawings in which several embodiments are illustrated by way of examples. It is to be expressly understood, however, that the drawings are for the purpose of illustration and description only, and are not intended as a definition of the limits of the invention.

In the drawings,

Figure 2 is a portion of the vertical transverse section of the combustion chamber illustrated in Fig. 1, the vertical section being taken along line 2—2, illustrated in Fig. 1.

Figure 3 is a perspective view of the combustion chamber illustrated in Figs. 1 and 2 with a portion of the outer shell of the toroid cut away for a clearer illustration of the wedge-shaped input and output ducts, or ports, of the chamber.

Figure 4 is a vertical section of a stationary combustion chamber with the input and output ports being located around the outer periphery of the toroid, while in Figures 1 through 3 these ports are located around the inner periphery.

Figure 5 is a transverse vertical section of the combustion chamber illustrated in Figure 4, the section being taken along line 5—5 shown in Fig. 4.

Figure 6 is an inner view of the combustion chamber illustrated in Figures 4 and 5, the view being taken along line 6—6 illustrated in Figure 5.

Figure 1:
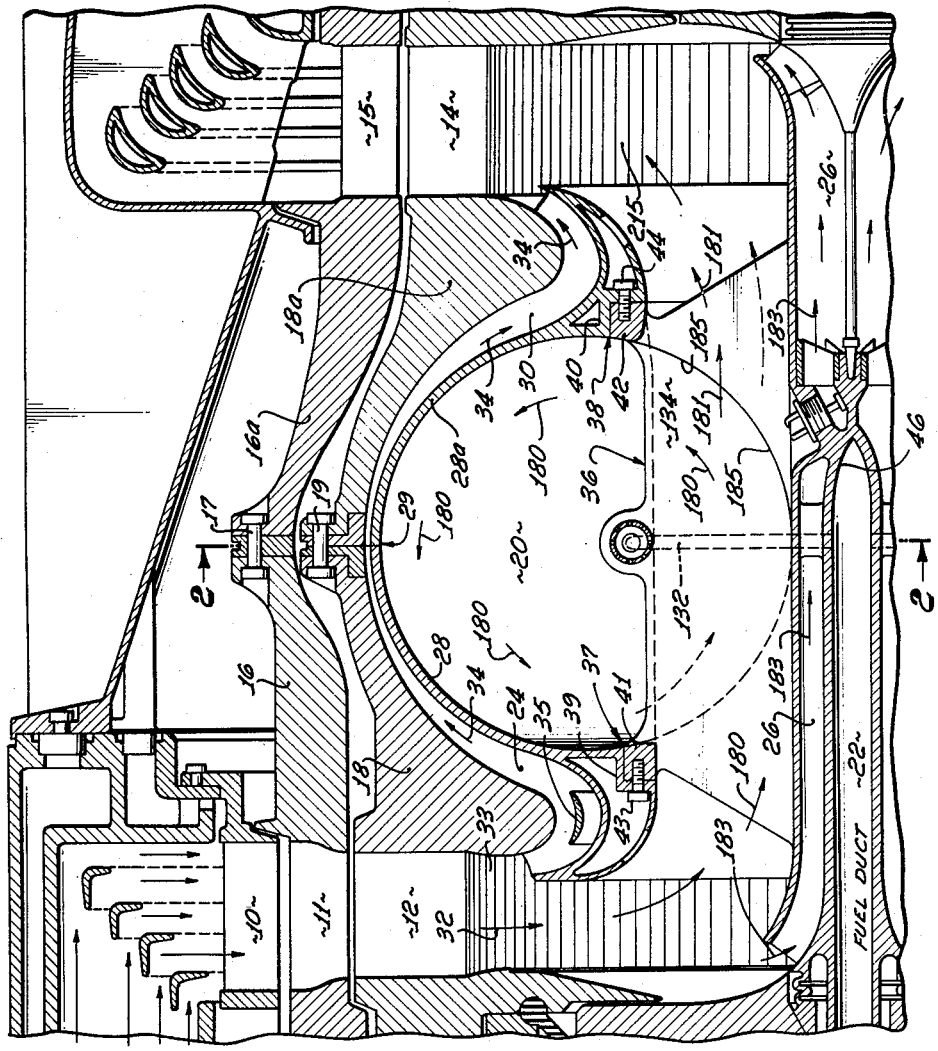
Figure 1 is a vertical sectional view of the upper half of the toroidal combustion chamber mounted between the second compressor stage and the first turbine stage and rotatable with these stages as a single mechanical unit; the sectional view is taken along a plane passing through the horizontal axis of rotation of the power plant.

Before proceeding with the detailed description, general principles of operation applicable to the toroidal combustion chambers will be given first and these principles will be compared with those used in connection with the combustion chambers now in use and thus known to the prior art.

The disclosed combustion heat generators use a novel process of combustion, which is particularly applicable to aircraft jet engines because of the stationary nature of the flame front. Combustion heat generators known to the prior art function on the basis of burning fuel on a flame front the stability of which is a function of the velocity of the air entering the combustion zone of the chamber. Since the maximum flame propagation velocity with liquid hydro-carbon fuels is of the order of 15 feet per second, the velocity of the air entering the combustion chamber cannot exceed this velocity. If the air velocity does exceed this limit of 15 feet per second, the flame front will begin to recede at the velocity in excess of 15 feet per second. Since the combustion chambers known and used by the prior art are all of the "straight-through" flow type, whether they use "canister" or "annulus" configurations, the stability and the actual position of the flame front is a direct function of the air velocity through the chamber. Efficient combustion is possible with the chambers of this type only when the air velocity is within narrow limits. If the air velocity exceeds this limit, the flame front recedes from the hot catalytic surface of the chamber, and efficient combustion ceases because of poor ignition and shortened path available for completing combustion of fuel. When the air velocity becomes still higher, the flame front is blown out of the chamber altogether, and the power plant ceases to function altogether. Restarting is difficult because of low ambient pressure, and low density of air at high altitudes which create high air velocity in the combustion chambers. Therefore, the operating ceiling of aircraft is limited by the flame front velocity in the straight-through flow in the combustion chambers.

When flame-front stabilizing baffles are used within the straight-through flow chambers, the straight-through flow combustion chambers inherently offer high resistance to air flow. The loss of pressure may be of the order of 8% of the total pressure at the entry to the combustion chamber. Such pressure loss cannot be recovered by subsequent diffusion and heating of air in the combustion chamber. Since the compression ratio in the known turbo-jet power plants is not especially high, such loss of pressure is especially disappointing since the thermodynamic and propulsive efficiencies of jet power plants are the functions of the compression ratios.

The toroidal vortex heat generator disclosed in Figures 1 through 6 function on the principle of vortex rotation of a flame mass, the position of the center of the vortex with respect to the longitudinal axis of the power plant being fixed, or stationary, irrespective of the air velocity through the toroidal chamber. Any increase or decrease in air velocity can have no other effect on the flame mass but only to increase or decrease its angular velocity, i.e., the rotation of the air mass around the center of the vortex, but the center of vortex will remain firmly fixed within the chamber. Therefore, blowing the flame front out of the toroidal vortex chamber is a physical impossibility.

In describing the functioning of the straight-through flow chambers, it has been stated that the efficiency of combustion in such chambers is affected by the air velocity through the chamber. While this is also true of the toroidal vortex chamber in theoretical sense, since indefinite increase in the angular velocity of the vortex eventually may reach such limits as to produce incomplete combustion, in practical sense this is not so because the operating limits for sustaining efficient combustion with the toroidal chamber are much wider than is the case with the known chambers. This is so because the hottest region in the toroidal chamber is at the center of the vortex, the locus of this center remaining stationary irrespective of the air velocity; therefore, this hottest center is a constant source of heat for sustaining or maintaining efficient combustion. The combustion efficiency will begin to decrease when the hottest region will begin to diminish in its diameter because of the excessive velocity of gases. To prevent such contingency, the diameter of the chamber may be increased in advance to include the range of such high air velocities, and what is important, such increase in diameter is within the practical limits of the toroidal chamber. A corresponding increase in length of the straight-through flow chambers is not as practicable because the resulting shift in the flame front is bound to produce inefficient combustion.

Before proceeding with the description of the physical configuration of the chambers, a brief description of the functional cycle will be given first, which will facilitate the understanding of its actual mechanical configuration. The combustion chamber has the shape of a toroid. Cold air enters the toroid around its inner periphery in one embodiment (Figures 1–3) and along the outer periphery in another version, (Figures 4–6). Upon entering the toroid, the air produces a toroidal vortex within the chamber, the center of the vortex being somewhat displaced outwardly from the center of the toroid if there is an axial rotation of the toroid. The vortex is continuous around the periphery of the chamber. The angular velocity of the vortex is not uniform, it is higher at the inner periphery of the toroid, and lower at the outer periphery because of the variation in the radial distance of the air particles from the central axis of the entire toroid, i.e., the longitudinal axis of the jet plant around which the toroid revolves in Figures 1–3. Fuel is brought into the chamber by atomizing jets which spray the fuel into the center of the toroid where it is burned under conditions of random turbulence within the central portion of the vortex. Therefore, the combustion phenomena can be imagined to contain a centrally located hot toroid surrounded by a cooler toroid, cold air entering the toroid following at first its outer walls. High angular velocity exists at the center of the vortex and it diminishes in radial direction from the center of the vortex according to the free vortex law. Low density but high velocity and temperature gas at the center of the vortex is diffused outwardly and the incoming air is drawn into the vortex, this process maintaining combustion at the center of vortex. The gases leaving the combustion chamber have a substantially uniform temperature because of mixing and diffusion of hot gases through the incoming air. Only a portion of the air required to produce substantially stoichiometric ratio is directed into the chamber. The remaining portion is by-passed and is used for cooling the outer walls of the chamber. The combustion chamber, because of the vortex path of the gases, furnishes a long path of travel to gases entering it, and therefore, it has a higher thermal efficiency than the chambers with shorter paths. Because of higher air velocities obtainable with the disclosed chambers, it has higher specific heat releases (B.t.u./ft.$^3$/hr./atmosphere of pressure) than the combustion chambers known to the prior art.

Referring to Fig. 1, it illustrates a vertical sectional view of a jet power plant utilizing a two-stage centripetal compressor, a toroidal chamber revolving with the second stage of the compressor and a two-stage radial flow centrifugal turbine. The compressor includes a stationary contra-prerotation stage 10, and first and second supersonic compression stages 11 and 12. The turbine includes the first stage, or the input stage, 14, and the second, or output stage 15. Stages 11 and 15 are connected through a hollow cylindrical member 16—16—a having two parts bolted together by means of bolts 17. Stages 12 and 14 are similarly connected through a hollow cylindrical member 18, 18a connected in the center by means of bolts 19. For a more detailed description of the over-all structure and operation of the power plant, reference is made to the parent application Serial No. 217,347 now U.S. Patent 2,804,747 more fully identified previously in this application.

The toroidal combustion chamber constitutes an integral part of the inner rotor which includes the second compressor stage 12, cylindrical member 18—18a input turbine stage 14, the toroidal combustion chamber 20, a centrally-mounted fuel duct 221 an outer, toroidally-shaped outer cooling duct 24; and an inner, or centrally located cooling duct 26. The entire inner rotor assembly is mounted on a shaft having left and right portions interconnected to each other through the second rotor members illustrated in Fig. 1, this second rotor revolving in one direction while the first rotor, mounted on the second shaft not visible in Figure 1, revolves in the opposite direction. Accordingly, the compressor and the turbine stages are contra-rotatable stages.

The toroidal combustion chamber, as viewed in Fig. 1, includes, an outer peripheral member, which may be called the semi-toroid member 28—28a which is joined along the outer periphery at 29 in any suitable manner such as a welded joint. The semi-toroid 28—28a is held in spaced relationship with respect to the cylindrical members 18—18a by members 41, 42, 134, 140 (Fig. 3) and bolts 43 and 44 with the result that a cooling duct 24 is formed between the outer surface of wall 28—28a and the inner surface of the cylindrical member 18—18a. Wall 28—28a is provided with a plurality of radially and outwardly extending ribs 30 which are best seen in Fig. 2. These ribs divide the outer duct 24 into a plurality of individual ducts 24 as best seen in Fig. 2. Compressed air leaves the second stage of the centripetal compressor 10—11—12 in the direction of arrows 32 and 33 and that portion of the air illustrated by arrow 33 enters duct 24 and, after flowing through this duct, leaves it, as illustrated by an arrow 34 whereupon it enters the first stage 14 of the turbine. The input portion of duct 24 may be provided with an airfoil 35 for assisting efficient turning of air at this point in the duct.

The outer semi-toroid 28—28a is fastened to the inner semi-toroid 36 by means of two circularly-shaped joints 37 and 38, semi-toroid 28 being provided with circularly shaped flanges 39 and 40, while the inner toroid is provided with circularly shaped, or ring-shaped, seats 41 and 42. The two semi-toroids (the actual angle subtended by the outer and inner "semi"-toroids need not be and is not equal to 180°. Therefore, the term "semi" is used here only in an approximate sense and for a lack of a better term; the angle subtended by the port portion of the toroid is less than 180°) are fastened to each other by means of a plurality of studs 43 and 44 uniformly distributed around the periphery of the two joints.

The inner semi-toroid includes the centrally, or axially, positioned fuel duct 22 which is connected to a fuel pump driven by one of the shafts of the power plant, turbine 14—15 providing the necessary motive power. The right end of the fuel duct 22 is closed off at 46 and the same end of the duct is provided with 16 radially disposed fuel conduits 132, Figs. 1, 2 and 3, which are drilled through transverse ribs, or radial vanes, 134, 135, 136, 137, 138, etc. Figs. 1, 2 and 3, these radial vanes forming eight input ports 140 through 147 and eight output ports 148 through 155. The outer ends of the radial conduits 132 terminate in sixteen fuel nozzles 156 which supply the fuel in gaseous form into the central toroid.

The compressed air, after leaving the second compressor stage, follows four paths; the first path leads to the input ports 140—147 which convey the air into the central combustion chamber toroid; the second path, although it by-passes the combustion chamber proper, it nevertheless flows through the input ports 140—147 and leaves these ports through slots 200—207; it is then mixed with hot gases leaving the chamber through the output ports 148—155; the third path follows the outer duct 24 surrounding the outer periphery of the combustion chamber, and the fourth path follows the inner duct 26 which is next to the inner periphery of the combustion chamber, the last two paths cooling the walls of the combustion chamber. The first path is indicated in Fig. 1 by arrows 180; the second path is indicated by arrows 181; the third and fourth paths are indicated by the arrows 34 and 183, respectively. The third path is also illustrated in Fig. 2 by duct 24, the fourth by duct 26, the first by the ports 140—147 and the second path by eight output ports 148—155. Referring to Figs. 2 and 3, duct 26 is concentric with the fuel duct 22 and extends through the entire axial length of the combustion chamber, whereupon it joins the input duct of the turbine, as illustrated in Fig. 1.

The first path, i.e., the air used for combustion, enters input ports 140—147, which are wedge shaped, with the sharp end of the wedge or the apex of the triangularly shaped segment, pointing in the direction of the turbine. The apex of this wedge forms a circularly-shaped path 185, Fig. 1, to direct the incoming air into the toroid of the chamber. These apices are also provided with slits, or slots, 200—207, Figs. 1, 2 and 3, which permit some of the air to pass directly from the input ports into the input turbine duct 215. These slots are provided to insure uniform mixing of hot and cold gases. Because of the wedge-shaped configuration of the input ports 140—147, and the circular terminations of these ports, by far the largest portion of the air entering these ports enters combustion chamber 20. Hot gases leave combustion chamber 20 through the output ports 148—155, which are also wedge-shaped, with the wide open ends of the wedges pointing in the direction of the turbine. Thus, the compressed air input ports, supplying air to the combustion chamber, are interleaved, or interlaced, with the hot gas output ports, the side-walls of the compressed air ports also constituting the walls of the hot gas output ports, i.e., the two types of ports having common walls, and being nested adjacent to each other to form a right cylinder. Examination of the geometry of these ports indicates that the outer portion or periphery, of the toroidal vortex, i.e., adjacent to the input side of the chamber, will have interleaved streams of relatively cool air (approx. 550° F.) and hot gases, the cool air entering the combustion chamber and the hot gases leaving it. The same type of interleaved, alternating streams of cool air and hot gases will be present immediately on the output side of the combustion chamber and the input duct of the turbine where uniform gas stream is obtained not by turbulent mixing but by mutual diffusion between the cool and hot streams. Elimination of turbulent mixing eliminates needless losses.

From the description of the combustion heat generator it follows that: blowing out of the flame front is prevented by making the diameter of the toroid sufficiently large to prevent such occurrence even when the air velocity reaches very high value; this is so because of the stationary nature of the flame locus; high thermal efficiency is obtained by providing long air path and efficient diffusion and a moderate degree of mixing of hot gases with cool air; low pressure drop is achieved because of low aerodynamic resistance of the entire combustion chamber. The combustion chamber, besides achieving the thermodynamic and aerodynamic improvements, has a number of mechanical advantages, not present in the prior art. Stated briefly, they are: compound curvature, which approaches in its configuration a sphere, produces low stresses in the shell of the toroid, although the total weight of metal is lower and the overall dimensions are smaller; the latter produces a chamber having smaller axial length, thus shortening the overall length of power plant. The chamber also has a low ratio of wetted surface to volume, thus reducing friction losses due to flow; however, what is more important in terms of the magnitude of actual aerodynamic losses, the disclosed generator eliminates a large number of orifices used in the annulus and canister generators which produce principal flow losses. The combustion heat generator has higher natural period in transverse direction than the natural period of the prior art chambers, thus contributing to quieter operation of the power plant and longer life of the chamber. There is less likelihood of carbon deposit because of free flow, and, finally, the chamber has a wider utility because of its applicability to all types of dynamic compression.

In the chamber shown in Figs. 1–3, the fuel duct is centrally located, along the axis of the power plant, and the input and output ports are mounted in concentric relationship with respect to the fuel duct. The port structure defines a cylindrical locus with the axis of this cylinder coinciding with the axis of the power plant. The outer portion of the toroid circumferentially surrounds all of the input and output ports. The above configuration, i.e., the central location of the input and output ports, with the outer portion of the vortex surrounding them, is the natural concomitant when power plant uses a centripetal flow compressor and a centrifugal flow turbine.

The basic principles of the combustion chamber, i.e., free vortex and fixed combustion locus, are applicable to any type of dynamic compression known, which includes the centrifugal, centripetal and axial compressors. In the case of the centrifugal and axial compressors, however, it is more advantageous to position the entry and the exit ports along the outer periphery of the toroid as illustrated in Figs. 4, 5 and 6, since the compressed air appears at and along the outer diameter of the compressors, whether centrifugal or axial. This being the case, the minimum length of the path from the compressor to the chamber would encounter at once the outer periphery rather than the inner periphery of the toroid.

Figures 4, 5 and 6 illustrate a toroidal combustion chamber of the above type. The combustion chamber, in this version, is a stationary member located between a compressor and a turbine. The combustion chamber illustrated in Figs. 4, 5 and 6 originally was disclosed in the co-pending application, Serial No. 216,305, filed March 19, 1951, now U.S. Patent 2,809,493, issued October 15, 1957. Therefore, Figs. 4–6 constitute a divisional application of the above parent application.

Referring to Fig. 4, air enters the combustion chamber in a tangential direction with respect to the outer periphery of the toroid, as illustrated by arrows 400 and 401, through an annular input duct 402 which is also visible in a "plan view" in Fig. 6. It is to be noted that Fig. 6 represents the view of the chamber taken along a circularly curved plane 6—6 which plane is then placed in the single plane of the drawing for simplifying the drawing.

The combustion chamber consists of an outer toroidal shell 404 and an inner toroidal shell 406. The two toroids are spaced from each other, the space between the two shells being used for circulating compressed air around the outer surface of the inner toroid for cooling wall 406 of the inner toroid. The inner toroid 406 constitutes the toroidal combustion chamber proper where air and fuel are mixed and burned. The entire combustion chamber is supported by a stationary frame 407 of the power plant. The two toroids are displaced from the concentric position with respect to each other to make duct 420 a constant velocity duct. Fuel is introduced into the input ports of the inner toroid by means of a plurality of fuel nozzles 408 which are uniformly distributed around the circular periphery portion 409 of frame 407. One fuel nozzle is provided for each input port; these fuel nozzles are visible, in a plan view, in Fig. 6. Each input port is also provided with a spark plug 410 for igniting the fuel-air mixture upon its formation in the input ports.

The compressed air is introduced into the cooling duct 460 by means of a plurality of input ports 412, which are also visible in Fig. 5, and also in Fig. 6. In Fig. 6 only the discharge ends 413 of these ports are visible in this figure. The compressed air, therefore, enters the input ports 412 in the manner indicated by arrow 401 in Fig. 4, and then flows through the tubularly shaped length of these ports until it emerges from these tubular ports at 414, Fig. 4. Ports 412 begin at the entry into the chamber and at exits 414. Upon entering ports 412, the compressed air flows around the toroid, as illustrated by arrows 415, whereupon it enters the discharge ports 416 which are adjacent to the input ports 412, as illustrated in Fig. 5. Therefore, the compressed air entering the cooling duct 412 describes 360° and travels along the path of a gradual spiral, the pitch of the spiral being determined by the angular displacement between the input ports 412 and the output ports 416. Upon leaving the tubularly shaped output ports 416, the heated air enters an annular output duct 418 which leads to a turbine. The turbine may be either an axial flow turbine or a centripetal flow turbine so that duct 418 is a short duct leading directly into the stator vanes of the turbine which impart proper direction of flow of the gases entering the rotor of the turbine. Directing of flow of the compressed air from ducts 412 to ducts 416 is obtained by interposing wall member 420 in duct 404 for closing off the input ports so that the compressed air can leave duct 404 only through the ducts 416.

The central toroid 405 is provided with a plurality of sector-shaped, or wedge-shaped, main input and output ports 422 and 424 which are placed around the outer portion of the inner toroid. The plan view of these ports is illustrated in Fig. 6; these ports are defined by wall members 426, 427, 428, etc. The side view of these members is illustrated in Fig. 4, where member 426 is illustrated as spanning the upper sector of the inner toroid 405. The compressed air enters the main input ports 422 in the manner illustrated by arrows 430, and it leaves the input ports in the manner illustrated by arrows 432, the burning gases being directed into the toroid 405 by the circular wall 406 of the inner toroid. The burning gases form a centrally located vortex of burning gases which is located in the center of the central toroid 405. Hot gases leave the central toroid 405 through the output ports 424 in the manner illustrated by arrows 434.

In the description of the combustion chambers given above, the combustion chamber in Figs. 1 to 3 was illustrated as being a rotatable chamber and the chamber in Figs. 4 to 6 as a stationary chamber. It should be apparent that either one chamber can be made either stationary or rotatable. If the chamber illustrated in Figs. 4–6 is made rotatable, then the fuel will have to be introduced from the center of the chamber, in the manner illustrated in Figs. 1 to 3.

It should also be understood that the volume of the main input ports 422 (wedge-shaped sectors) may be made smaller than the volume of the main output ports 424. This can be accomplished by reshaping the walls 426, 427, 428 in the manner illustrated in Fig. 6, which increases the volume of the output ports as compared to the volume of the input ports. This configuration of the ports is consistent with the increase in volume of gases leaving the chamber as compared to the volume of compressed air entering the chamber. The increase in volume is due to a marked rise in temperature of the gases and generation of additional gases, such as carbon dioxide and super heated water vapor, when fuel is burned in the combustion chamber.

In summarizing the discussion relating to the volumes of the main input and output ports, one general rule which should be kept in mind is that it is a good practice to keep the entry Mach number equal to the exit Mach number. In such a case, the ratio of the exit-to-entry areas is:

$$A_1 C_1 \gamma_1 = A_2 C_2 \gamma_2 \tag{1}$$

which equation is merely a continuity equation wherein $A_1$ and $A_2$ = respective port areas;
$C_1$ and $C_2$ = respective absolute velocities of fluid in the input and output ports; and
$\gamma_1$ and $\gamma_2$ = are the specific densities of gases.

It may be shown that, for constant Mach numbers, $M_1$ and $M_2$ at the entry and exit of the chamber, $$\frac{A_2}{A_1} = \sqrt{\frac{T_2}{T_1}} \tag{2}$$

where $T_1$ and $T_2$ are the absolute temperatures of gases; and $$\frac{C_2}{C_1} = \sqrt{\frac{T_2}{T_1}} \tag{3}$$

From (2) and (3), it follows that the area ratio and the velocity ratio are proportional to the square root of the temperature ratio for constant Mach number.

If this is taken as a condition for determining the entry and the exit areas of the input and output ports, and this is not mandatory, one may derive, by way of example, for $$T_1 = (600 + 460)° R \text{ and } T_2 = (1650 + 460)° R$$

$$\frac{A_2}{A_1}=1.41 \qquad (4)$$

Under such conditions the exit area should be approximately 40% greater than the entry area. However, this is only an arbitrary stipulation. Moreover, the combustion process is too complex to follow precisely the above simplified treatment of the area relationship for obtaining equal Mach number at the entry and exit of the respective ports. As far as velocity $C_2$ is concerned, assuming $C_1$ to be approximately 250 ft./sec., which is the usual value, $C_2$ would be 350 ft./sec. which is low for exit velocity. Therefore, $C_2$ can have a much higher value and much higher Mach number at the exit, and the area ratio $A_2/A_1$ could be equal to 1.0 without any marked detriment, provided such velocity relationship is suitable for overall design.

The shape of the main input and output ports, such as ports 422, 424 and ports 148—155, has been described in the specification as being wedge-shaped. Such description is only approximately correct because the "wedge-shaped" convergence of the ports takes place in a vertical plane toward the center, as illustrated in Fig. 2, for example, and there is also a "wedge-shaped" convergence in the direction of the longitudinal axis 170, as illustrated in Fig. 3. Such dual "wedge-shaped" form will be referred to in the claims as the "dual wedge-shaped" convergence for lack of a better term.

What I claim is:

1. A combustion chamber comprising a hollow toroid having an inner surface; the cross-sections of said toroid taken on planes passing through the central axis of said toroid being substantially circular; a plurality of input ports positioned within said toroid; said input ports being spaced from one another about and in substantially concentric relation to the central axis of said toroid, each said input port having an intake portion positioned to receive compressed air in a direction substantially tangent to said toroid and substantially parallel to the central axis of said toroid; said input ports terminating at a substantially circularly curved inner surface within said toroid for discharging said air along said substantially circularly curved inner surface of said toroid thereby to create a transverse free vortex of gases within said toroid revolving substantially about the peripheral circular center-line of said toroid; means for injecting fuel into said toroid; and a plurality of output ports positioned within said toroid; said output ports being spaced from one another in interleaved relation to said input ports, each said output port having a gas-receiving portion defined, in part, by the inner substantially circularly curved surface of said toroid, and an output portion for discharging said gases away from said toroid in a direction substantially tangent to said toroid and substantially parallel to the central axis of said toroid.

2. A combustion chamber including an elongated fuel duct, a plurality of input and output ports mounted in a substantially circular array disposed in substantially concentric relationship with respect to said fuel duct, said input ports interleaving, or interlacing with, said output ports, and a combustion chamber shaped as a hollow toroid having substantially circular cross-sections on planes passing through the central axis of said toroid, said toroidal combustion chamber being disposed in surrounding relationship to said fuel duct whereby said fuel duct is disposed substantially along the central axis of said toroidal chamber with said ports being positioned between said fuel duct and portions of said combustion chamber adjacent said central fuel duct, the inner portion of said toroid having a common volume with all of said input and output ports, whereby said ports are positioned within the inner portion of said toroid, said input ports having a first set of openings in said toroid for conveying compressed air into said toroid adjacent the central axis thereof and said output ports having a second set of openings in said toroid for discharging heated gases from said toroid adjacent the central axis thereof, said input and output ports being in communication with substantially circularly curved portions of the inner surface of said toroidal combustion chamber whereby air passing from said input ports into said chamber and heated gases passing from said chamber to said output ports describe a transverse free vortex of gases revolving substantially about the peripheral circular center-line of said toroid.

3. A combustion chamber including a fuel duct, a plurality of input and output ports mounted in concentric relationship with respect to said fuel duct, said input ports interleaving, or interlacing with, said output ports, a combustion chamber shaped as a hollow toroid, the inner portion of said toroid having a common volume with all of said ports, whereby said ports are positioned within the inner portion of said toroid, said input ports having a first set of openings in said toroid for conveying compressed air into said toroid and said output ports having a second set of openings in said toroid for discharging heated gases from said toroid, a first air duct surrounding said fuel duct and being adjacent to the outer surface of said toroid, and a second air duct shaped as a hollow semi-toroid adjacent to and in spaced relationship with respect to the outer portion of said toroid, said first and second air ducts normally carrying compressed air for cooling said toroid.

4. A combustion chamber comprising a hollow toroid having a plurality of input and output wedge-shaped, or sector-shaped, ports having base portions and apex portions, said chamber receiving compressed air at the base portions of said input ports and discharging gases into said toroid at the apex portions of said input ports, said output ports receiving hot gases at the apex portions of said output ports and discharging said hot gases at the bases of said output ports, said input ports interleaving, or interlacing, said output ports, and the apices of the input ports pointing in the opposite direction to the apices of the output ports.

5. A combustion chamber as defined in claim 4 which also includes a first set of slot-shaped openings at the apices of the input ports and a second set of slot-shaped openings at the apices of the output ports, said first set of openings conveying compressed air from said input ports into exhaust gases and said second set of openings conveying compressed air into said output ports.

6. A combustion chamber as defined in claim 4 in which said input and output ports have common side-walls, and fuel ducts imbedded in said side-walls, said ducts terminating in fuel nozzles for spraying fuel into compressed air entering said input ports.

7. A combustion chamber comprising a first, hollow inner toroid and a second, hollow outer toroid surrounding said first toroid and asymmetrically spaced from said first toroid to form a constant cross-sectional area flow channel between said first and second toroids, a first plurality of input and output ports for said flow channel, said input ports interleaving said output ports, said first plurality of ports being positioned between said toroids, and a second plurality of input and output ports, said second input ports conveying compressed air into said first toroid, and said second output ports discharging heated gases from said first toroid.

8. A stationary combustion chamber for a gas turbine power plant positioned between a dynamic compressor, supplying compressed air to said chamber, and a turbine receiving hot gases from said chamber, said chamber comprising a first hollow toroid having a plurality of input ports having input and output portions, said input ports having triangularly-shaped cross section in a transverse plane of progressively decreasing area as one progresses from the input portion to the output portion of each input port, the output portions of said input ports following the inner circular surface of said toroid, the compressed air from said compressor entering said input portions of said input ports and then tangentially discharging into said toroid, a plurality of similarly shaped output ports having similarly shaped input and output portions, the input ports interleaving, or interlacing, the output ports, the input portions of the input and output ports being adjacent to each other along the periphery of said toroid whereby the compressed air and products of combustion create a gaseous vortex within said toroid, said products of combustion discharging from said toroid in the same direction as the compressed air entering said toroid.

9. The combination of claim 1 wherein the entry cross-sectional area $A_1$ of the input ports and the exit cross-sectional area $A_2$ of the output ports follow the relationship:

$$\frac{A_2}{A_1} = \frac{T_2}{T_1}$$

where $T_1$ is the absolute temperature of air entering said toroid, and $T_2$ is the absolute temperature of gases leaving said toroid.

10. The combination of claim 1 in which the dimensions of the input and output ports are proportioned to approximate the relationship:

$$M_1 = M_2$$

where $M_1$ is the Mach number at the entry into an input port and $M_2$ is the Mach number at the exit from an output port.

References Cited in the file of this patent

UNITED STATES PATENTS

| | | |
|---|---|---|
| 2,243,467 | Jendrassik | May 27, 1941 |
| 2,360,130 | Happner | Oct. 10, 1944 |
| 2,665,549 | Newcomb | Jan. 12, 1954 |

FOREIGN PATENTS

| | | |
|---|---|---|
| 942,386 | France | Sept. 13, 1948 |